United States Patent
McCormick

[11] 3,844,305
[45] Oct. 29, 1974

[54] MONITOR UNIT

[76] Inventor: John Paradis McCormick, 521 Hilmar St., Santa Clara, Calif. 95050

[22] Filed: June 20, 1973

[21] Appl. No.: 371,889

[52] U.S. Cl.................. 137/78, 239/63, 307/118, 335/206
[51] Int. Cl. ....................... A01g 25/00, H01h 41/00
[58] Field of Search ......... 137/78; 239/63; 335/206; 307/118

[56] References Cited
UNITED STATES PATENTS

| | | | |
|---|---|---|---|
| 2,695,976 | 11/1954 | Hasenkamp | 239/63 X |
| 2,796,291 | 6/1957 | Mueller | 137/78 X |
| 3,660,789 | 5/1972 | Weisenburger | 335/206 |

*Primary Examiner*—Martin P. Schwadron
*Assistant Examiner*—Richard Gerard
*Attorney, Agent, or Firm*—John N. Randolph

[57] ABSTRACT

An apparatus or unit for use with a number of tensiometers, for example, which may be located in different areas of a field to sense the moisture content of the soil in the area where each tensiometer is located. Each tensiometer is connected in series with a load, such as, a solenoid of a valve located in an irrigation line or a pump. The unit includes reed switches connected in series with the tensiometers and which are intermittently closed by the movement of a permanent magnet into close proximity thereto, so that the closing of a reed switch which is connected in series with a tensiometer, the switch of which is closed as a result of a lack of moisture in the earth in the area where said tensiometer is located, will complete a circuit through the load to supply water to the area until said tensiometer switch resumes a circuit interrupting position. A triac is interposed in the circuits of the tensiometers and reed switches and is energized by the closing of one of said circuits for shorting out or opening the electric circuit of another triac which interrupts operation of an electric motor by which the permanent magnet is moved successively across the reed switches, so that movement of said permanent magnet is interrupted whenever a reed switch, actuated thereby, and a tensiometer connected in circuit with said reed switch are both in circuit closing positions.

8 Claims, 2 Drawing Figures

MONITOR UNIT

SUMMARY

It is a primary object of the present invention to provide a device which will eliminate the need to utilize a timing switch for accomplishing the result of the present invention and which has the disadvantage that it energizes an electric circuit of a load for a predetermined time interval irrespective of whether such interval is sufficient or more than sufficient for adequately replenishing the moisture content of the soil, for example.

Another object of the present invention is to provide a unit wherein only a short time interval will normally elapse between the time that the moisture content of the soil of a particular area needs to be replenished and when water is supplied thereto.

A further object of the invention is to provide an apparatus of extremely simple construction which is capable of being utilized with any number of electric circuits each including a switching tensiometer, a load and a reed switch for automatically controlling the replenishment of moisture in areas of a field or fields some of which may be located at points quite remote from the unit.

Various other objects and advantages of the invention will hereinafter become more fully apparent from the following description of the drawing, illustrating presently preferred embodiments thereof, and wherein:

DESCRIPTION OF THE PREFERRED EMBODIMENTS

Figure 1:
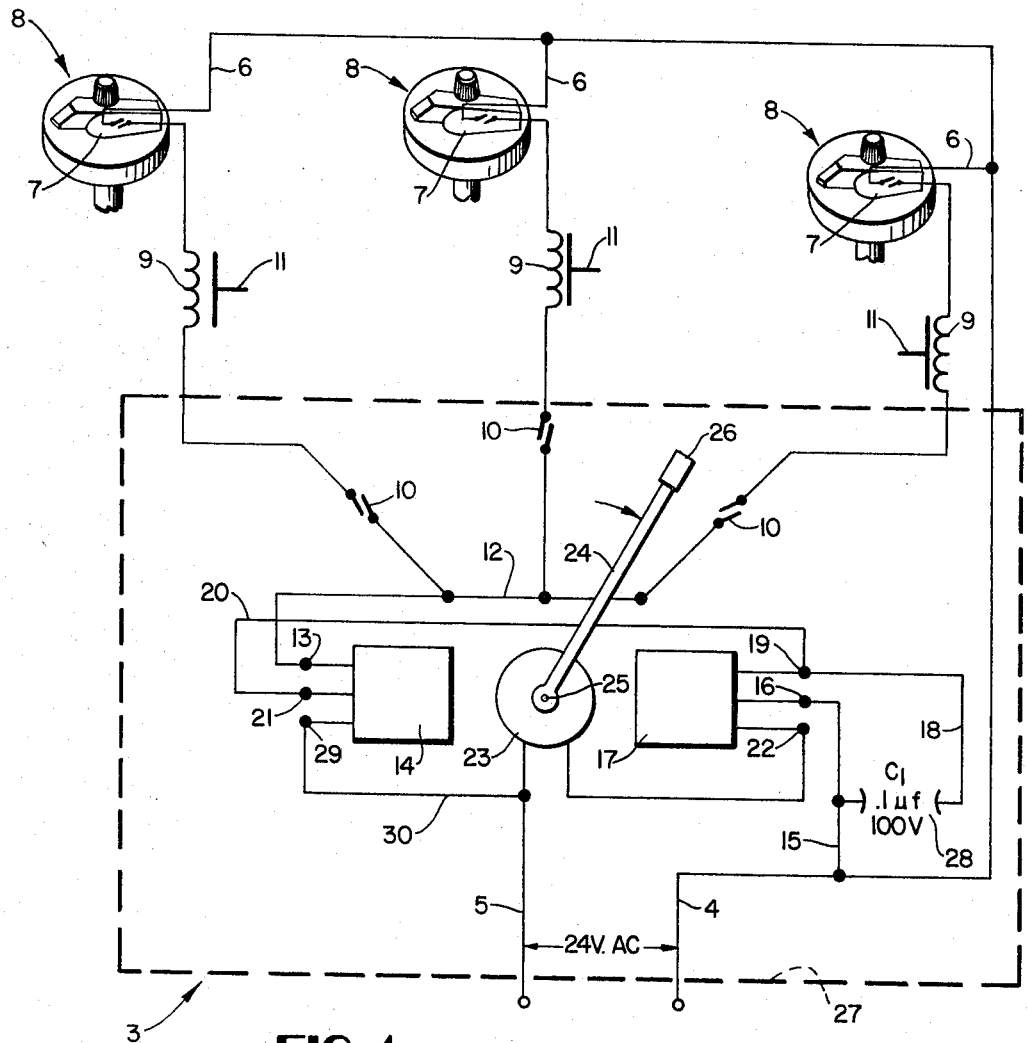
FIG. 1 is a diagramatic view illustrating one embodiment of the invention.

Referring more specifically to the drawing, and first with reference to FIG. 1, the monitoring unit in its entirety and as disclosed therein is designated generally 3, and includes two electrical conductors 4 and 5 leading from a current source, such as 24 volt alternating current. The conductor 4 has three branch conductors 6 in each of which is interposed the switch 7 of a switching tensiometer 8, a load 9 and a reed switch 10. The tensiometer 8 may correspond with the tensiometer as disclosed in my U.S. Pat. No. 3,806,851, issued Apr. 23, 1974. The load 9 is illustrated as the solenoid of a valve 11 controlling the supply of water through a branch of an irrigation system, not shown. Likewise, the load 9 could constitute a water pump connected to a source of water. The opposite ends of the branch conductors 6 connect with a conductor 12 which leads to and connects with a terminal 13 of a triac 14.

Another branch conductor 15 leads from the conductor 4 and connects with a terminal 16 of another triac 17. A branch conductor 18 extends from the branch 15 and connects with a gate 19 of the triac 17. A capacitor 28 is interposed in the branch conductor 18. A conductor 20 leads from another terminal 21 of the triac 14 and connects with the gate 19 of the triac 17. The other conductor 5 is connected to a terminal 22 of the triac 17 and an electric motor 23 is interposed in said conductor 5.

In the embodiment as illustrated, an arm 24 is shown fixed to and extending radially from the shaft 25 of the motor 23 and supports a permanent magnet 26. The magnet 26 and the three reed switches 10 are all located the same distance from the axis of the shaft 25.

The motor 23 may be suitably secured to one side of a support member 27 through which the shaft 25 extends and in which it is turnably disposed. The arm 24 and the magnet 26 are disposed on the other side of the support 27, so that as the magnet revolves with the shaft 25 and the arm 24, it will pass over or in close proximity successively to the switches 10 for closing each switch 10 while the magnet is disposed adjacent thereto.

The capacitor 28 allows only sufficient current to flow to the gate 19 to trigger the triac 17 so that said triac is normally in a circuit closing position in order that the motor 23 will be energized for rotating the shaft 25 for moving the magnet 26 successively across the reed switches 10. The shaft 25 could revolve at one r.p.m. or even at a slower speed, such as one-fifth r.p.m.. The tensiometers 8 may be located at any distance from the support 27 in different areas of a field where the moisture content of the soil is to be monitored, or even in different fields.

If the switch 7 of a tensiometer 8 is open when the switch 10 of the circuit in which said switch 7 is interposed is closed by the magnet 26, the circuit will not be completed through the branch conductor 6 which includes said switches 7 and 10, so that the motor 23 will continue to turn the shaft 25 for moving the magnet 26 away from said switch 10 to allow said switch 10 to resume an open position. However, if the magnet 26 closes a reed switch 10 which is disposed in series with a switch 7 which is closed due to the fact that the tensiometer of which it forms a part is located in soil requiring a replenishment of moisture, a circuit will be completed through said branch conductor 6 which includes said closed switches 7 and 10 for energizing the solenoid 9 of said circuit for opening the valve 11 thereof, to allow water to flow through the irrigation line by said valve for irrigating the earth surrounding said solenoid 8. When this occurs, current will flow from said branch conductor 6 through the conductor 12 and terminal 13 to energize the triac 14 which is normally deenergized. This allows current to flow through the triac 14 to its gate 29 and back to the other main conductor 5 through a conductor 30. The closing of the circuit in triac 14 results in current flowing from its terminal 21 through the conductor 20 to the gate 19 of triac 17, causing a short circuit on the gate 19, as a result of which current that was flowing into triac 17 and through the gate 19 from conductor 18 is drained off. As a result, triac 17 assumes a circuit breaking or open position thereby cutting off the current to the motor 23 for stopping rotation of the shaft 25, with the magnet 26 remaining in the postion for maintaining the reed switch 10, which is disposed in series with the closed switch 7, in a closed position.

When said tensiometer switch 7 resumes an open position, due to the moisture in the soil being monitored by the tensiometer 8 of said switch 7 being sufficiently replenished, the aforedescribed circuit through the triac 14 is interrupted causing said triac to return to its normal open position, as a result of which current again flows through the capacitor 28, conductor 18 and gate 19 into and through the triac 17 and through the terminal 22 to the conductor 5 in which the electric motor 23 is interposed.

It will thus be apparent that the monitor as illustrated in FIG. 1 can be caused to function continuously for checking any number of field areas for moisture and to properly replenish the moisture automatically in any depleted areas and only to an extent sufficient to overcome the deficiency.

Obviously a conventional timing switch, not shown, could be interposed in the monitor circuit to permit the unit 3 to function only certain hours during each twelve or twenty-four hour period.

The unique part of the electrical circuit of the unit 3 resides in the use of the triac 14, the gate 29 of which together with the conductor 30 carries the main load through the line 5, and in addition functions to interrupt the circuit between the main lines 4 and 5 by shorting out the gate 19 of triac 17. Another unique feature of the electrical circuit resides in the fact that the resistance in the triacs 14 and 17 is so low that it does not effect the line voltage.

Figure 2:
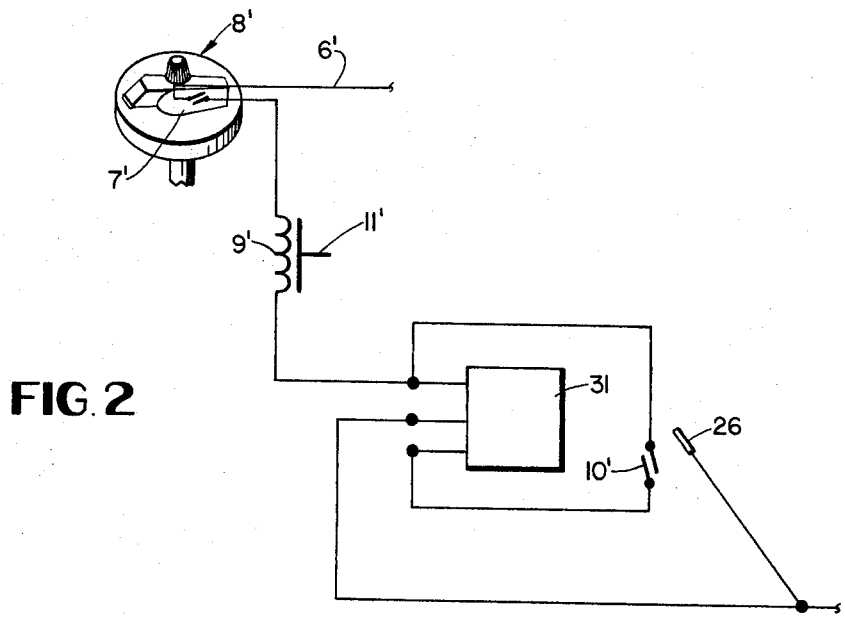
FIG. 2 is a fragmentary diagramatic view illustrating a slight modification thereof.

Referring to FIG. 2, a triac 31 is shown interposed in a conductor 6', corresponding to one of the conductors 6, to reduce the current flow and so that the reed switch 10' will then function to control the triac 31 which assumes the main load, as disclosed by my aforementioned U.S. Patent. The closing of the reed switch 10', when the switch 7' of the tensiometer 8' is in a closed position, causes the triac 31 to assume a circuit closing position so that current can pass therethrough and the triac 31 will be in series with the switches 7' and 10' and the load 9'.

Various modifications and changes are contemplated and may be resorted to without departing from the function or scope of the invention.

I claim as my invention:

1. A monitoring unit comprising an electric circuit, a normally open electric sensor interposed in said circuit and responsive to an abnormal condition to assume a circuit closing position, a reed switch interposed in said circuit in series with said sensor, a permanent magnet, electrically driven means interposed in said circuit for periodically moving said permanent magnet into proximity with the reed switch to effect the closing of the reed switch, electrically actuated means interposed in the circuit in series with the sensor and reed switch for effecting the correction of the abnormal condition causing the movement of the sensor to a circuit closing position, whereby said last mentioned means will be energized when the reed switch is closed by the permanent magnet, and means interposed in said circuit for interrupting movement of the permanent magnet from a position maintaining the reed switch in a closed position, so long as the sensor remains in a circuit closing position.

2. A monitoring unit as in claim 1, said electric sensor comprising a switching tensiometer disposed in the ground remote from the reed switch for checking the moisture content of the ground adjacent said tensiometer.

3. A monitoring unit as in claim 2, said electrically actuated means comprising a normally closed electrically actuated valve of an irrigation system for supplying water to the area in which the tensiometer is located.

4. A monitoring unit as in claim 3, and a plurality of additional tensiometers disposed in other earth areas remote from said first mentioned tensiometer and from one another, a normally closed electrically actuated valve of the irrigation system and a reed switch interposed in series with each of said last mentioned tensiometers and constituting additional parts of the circuit, and each of said last mentioned reed switches being disposed in the path of travel of the permanent magnet to be periodically closed thereby.

5. A monitoring unit as in claim 1, a first triac interposed in said circuit in series with said electrical means for driving the permanent magnet and normally disposed in a circuit closing position, and a second triac interposed in said circuit in series with said reed switch and sensor and normally disposed in a circuit interrupting position, said second triac being caused to assume a circuit closing position by movement of the sensor and reed switch to circuit closing positions, to effect movement of the first triac to a circuit interrupting position for interrupting operation of said electrical driving means.

6. A monitoring unit as in claim 1, and a triac interposed between and in series with said sensor and reed switch.

7. A monitoring unit as in claim 5, and a triac interposed between and in series with the sensor and reed switch.

8. A monitoring unit as in claim 5, and a capacitator interposed in said circuit in series with said first triac and said electrical driven means.

* * * * *